March 29, 1966  R. W. WATERFILL  3,242,943
FLOW CONTROL

Original Filed Aug. 10, 1960  2 Sheets-Sheet 1

INVENTOR.
ROBERT W. WATERFILL
BY
Robertson Smythe & Bryan
ATTORNEYS

March 29, 1966     R. W. WATERFILL     3,242,943
FLOW CONTROL

Original Filed Aug. 10, 1960     2 Sheets-Sheet 2

INVENTOR.
ROBERT W. WATERFILL
BY
ATTORNEYS

3,242,943
FLOW CONTROL

Robert W. Waterfill, Charlotte, N.C., assignor to Buensod-Stacey Corporation, New York, N.Y., a corporation of Ohio
Original application Aug. 10, 1960, Ser. No. 49,080, now Patent No. 3,187,768, dated June 8, 1965. Divided and this application Oct. 20, 1964, Ser. No. 405,102
3 Claims. (Cl. 137—512.1)

This is a division of application Serial No. 49,080, filed August 10, 1960, in the name of Robert W. Waterfill, now Patent Number 3,187,768.

The present invention relates to fluid flow control devices and particularly to an arrangement for maintaining a desired flow pattern, regardless of upstream pressure changes, by employing a smoothly acting swingable-type damper while avoiding flutter and slamming thereof.

The principal object of this invention is to provide a swingable-type damper that is responsive to, and powered by, upstream pressure for maintaining a predetermined flow pattern.

Another object of the invention is to provide such a fluid control device including a swingable damper that is smooth in action, and which avoids fluttering and slamming.

Another object of this invention is to provide such a fluid control device including a swingable damper provided with unbalanced force producing means which latter varies in response to variations in upstream pressure changes.

Another object of this invention is to provide such a fluid control device including a swingable damper that is moved toward a closed position by the upstream pressure, while the rate of closing is controlled by varying the forces acting on the damper on each side of its pivot.

Another object of this invention is to provide such a fluid control device including a swingable damper in which an unbalanced area arrangement of the damper diminishes as the upstream pressure increases, to thereby temper the thrust as the damper swings toward a closed position.

Another object of this invention is to provide a swingable type of damper in which the pivot point automatically shifts in response to upstream pressure variations to produce degrees of effective damper area variation on each side of the pivot.

Another object of the invention is to provide a swingable damper pivot in a manner such that the force moment incident to fluid flow past the damper and acting to open the damper diminishes more rapidly than that acting to close it when the damper is moved from a closed position toward an open position, and vice versa.

In one aspect of the invention, the damper may be arranged with a fixed effective area differential between the two sides of its pivot point, and resilient means may be provided to normally maintain the damper blade in a position to provide a predetermined flow of air through the damper. In order to prevent slamming shut of the damper when the upstream pressure rises, a pocket may be provided of flexible material mounted on the damper. This pocket may extend downstream beyond the damper, and an adjustable stop may be provided slightly downstream from the closed position of the damper so as to progressively engage the flexible material of the pocket as the damper closes, thereby absorbing the thrust caused by the increased upstream fluid pressure.

In another aspect of the invention, the damper may be arranged with the same or a different effective area on each side of the pivot point, and the lower side of the blade may be provided with slots therein for permitting free flow of fluid therethrough, thereby in effect producing a lesser effective damper area below the pivot point than above it. Progressively spaced, radial vanes may be provided in the path of movement of the lower portion of the damper and they may be so arranged that the fluid flow and/or resilient means maintain them in their spaced locations. As the damper moves toward a closed position, the vanes successively block the slots in the lower portion of the damper, thereby diminishing the differential effective area on both sides of the pivot and preventing flutter or slamming of the damper.

In another aspect of the invention, the damper may be mounted on a pivot shaft spaced upstream from the plane of the damper when in closed position. An arm may be fixed to the pivot shaft exteriorly of the duct in a manner to form a bell crank with the spacing means supporting the damper. The free end of the bell crank arm may be connected to a spring anchored to the outside of the duct containing the damper. Since the pivot shaft of the damper is spaced upstream from the plane of the damper when closed, during the pivoting of the damper about this shaft in opening, the force moment incident to the fluid flow past the damper tending to open it decreases more rapidly than that tending to close it. Conversely, movement of the damper toward a closed position causes a more rapid increase in the force moment tending to resist said closing than that tending to effect said closing. Accordingly, the force moments tend to balance each other when the damper moves toward its closed position.

The above as well as other objects and novel features of the invention will become apparent from the following specification and accompanying drawings which are merely exemplary.

Figure 2:
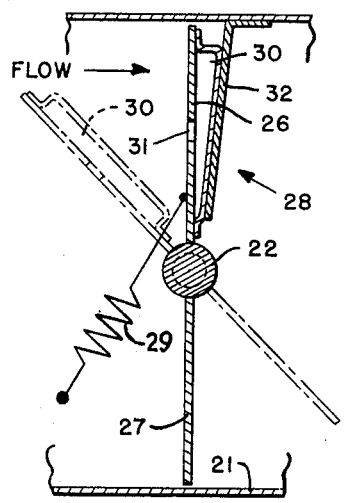
FIG. 2 is a sectional view taken substantially along line 2—2 of FIG. 1.
Figure 1:
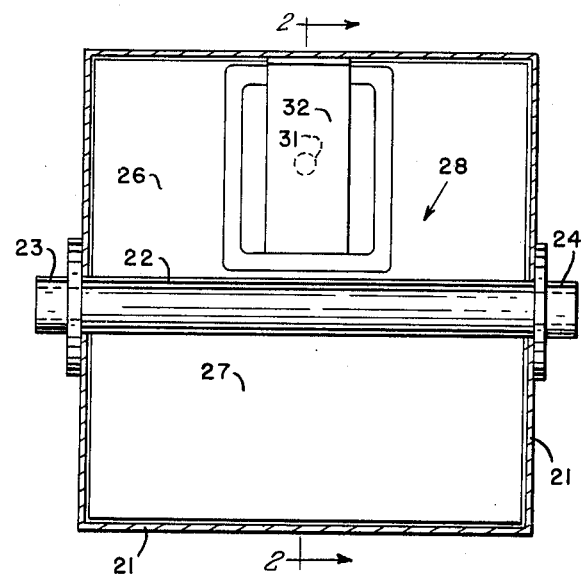
FIG. 1 is a cross-sectional view of a duct including a damper to which the principles of the invention have been applied.

Referring to the embodiment of FIGS. 1 and 2, the principles of the invention are shown as applied to a duct 21 having a pivot shaft 22 extending transversely thereacross and journaled in bearings 23 and 24 having flanges fixed to the outer side walls of the duct 21. Upper and lower portions 26 and 27 of a damper 28 may extend radially from the shaft 22. The amount by which the upper portion 26 extends radially from shaft 22 may be greater than that of portion 27 in order to provide an unbalanced effective area arrangement tending to move the damper 28 in a clockwise direction (FIG. 2) with the fluid flow as indicated by the arrow therein.

A spring 29 or other biasing means may be employed to maintain the damper 28 in a position to pass a predetermined flow of fluid which may be designed to provide a predetermined balance of forces between that due to the effective area differential between portions 26 and 27 and that of spring 29. A flexible pocket member 30 may be fixed to the downstream side of the portion 26, and an opening 31 may be provided in portion 26 permitting the flexible member 30 to be filled with fluid. A stop means 32 may be adjustably fixed within the duct 21 downstream of the closed position of the upper portion 26 in a manner to cooperate with the blown-up flexible member 30 to intercept its movement and cushion the closing action of the damper 28 by forcing the air from within the flexible member outwardly through the orifice 31.

Figure 3:
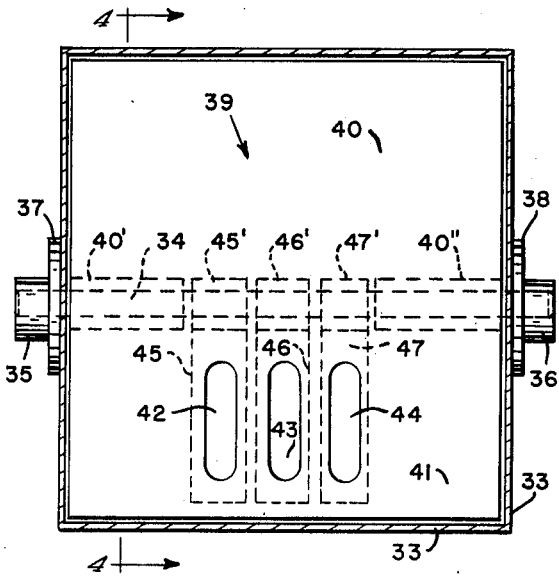
FIG. 3 is a cross-sectional view of a duct including a damper to which a modified form of the principles of the invention has been applied.
Figure 4:
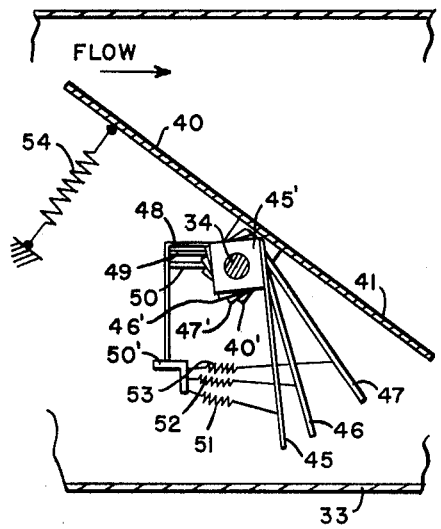
FIG. 4 is a sectional view taken substantially along line 4—4 of FIG. 3.

Referring to the embodiment of FIGS. 3 and 4, the principles of the invention are shown as applied to a duct 33 having a pivot shaft 34 that is journaled in end bearings 35 and 36 having flanges 37 and 38 fixed to the outside walls of duct 33. A damper 39 having portions 40 and 41 of different area may extend radially in a plane from the shaft 34. In the embodiment disclosed, the area of portion 40 exceeds that of portion 41 with the fluid flow in the direction of the arrow in FIG. 4. The portion 41 may be provided with a plurality of slots or ports 42, 43 and 44, further increasing the effective area differential between portions 40 and 41. Corresponding vanes 45, 46 and 47 may be mounted on shaft 34 for free oscillatable movement thereabout. The vanes 45, 46 and 47 are adapted progressively to seal off the respective slots 42, 43 and 44 when the damper 39 moves from its open position toward a closed position to reduce the effective differential area between portions 40 and 41.

The vanes 45, 46 and 47 may each include a hub 45', 46', and 47', respectively, of rectangular cross section. The hubs 45', 46' and 47' may be journaled in spaced relation on shaft 34. The damper 40, 41 may be fixed to spaced rectangular hubs 40', 40" also journaled in spaced relation on shaft 34. Separate stops 48, 49 and 50 may be fixed to a stationary support 50'. Each of the stops 48, 49 and 50 is adapted to engage one of the hubs 45', 46' and 47', respectively, and to limit the counterclockwise movement of the corresponding vanes 45, 46 and 47, respectively, a different predetermined amount.

Compression springs 51, 52 and 53 may be fixed to the support 50' and also to the vanes 45, 46 and 47, respectively, urging them in a clockwise direction until their corresponding hubs engage stops 48, 49 and 50.

A spring or weight device 54 may be employed to hold the damper 39 open to a position to pass a predetermined quantity of air past the damper, against the force tending to close the damper due to the portion 40 having a greater effective area than the portion 41.

With the apparatus in the condition shown in FIG. 4, increases in upstream pressure will cause the damper 39 to turn clockwise toward a closed position. As this occurs, successive of the slots 44, 43 and 42 are sealed off, thereby tending to balance the effective areas of the portions 41 and 40 and increasing the resistance to closing of the damper 39. In this way, slamming of the damper 39 closed will be avoided.

Figure 5:
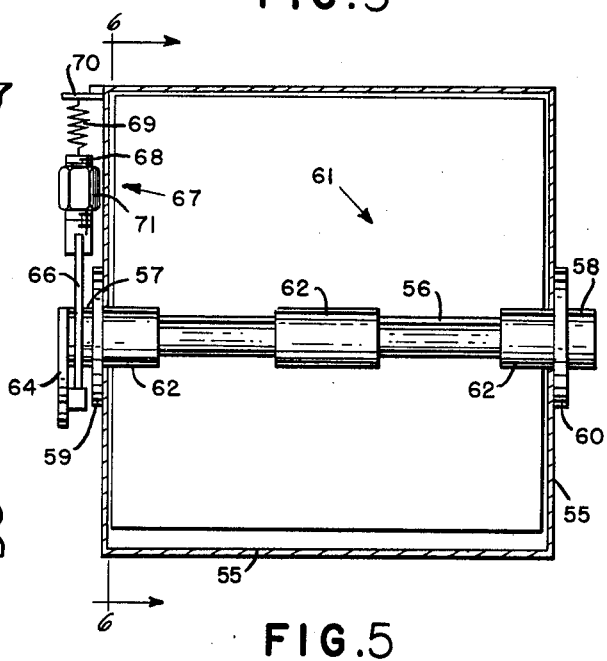
FIG. 5 is a cross-sectional view of a duct including a damper to which still another modified form of the invention has been applied.
Figure 6:
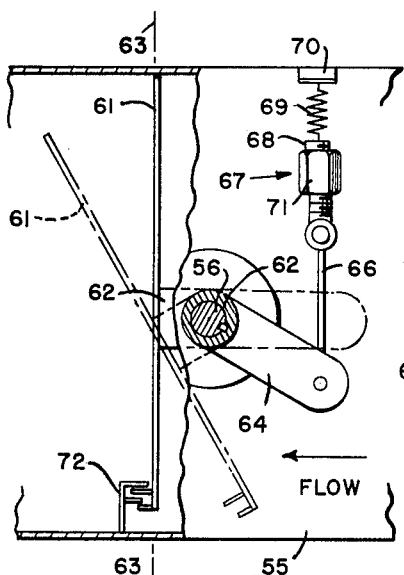
FIG. 6 is a view taken along line 6—6 of FIG. 5.

Referring to FIGS. 5 and 6, the principles of the invention are shown as applied to a duct 55 across which a pivot shaft 56 extends and which shaft is journaled in bearings 57 and 58 having flanges 59 and 60 fixed to the outside of the duct 55.

A damper 61 may be provided with bosses 62 through which the shaft 56 extends, and to which bosses the shaft 56 is fixed. The arrangment may be such that the plane 63—63 of the closed position of damper 61 is downstream from the pivot shaft 56. A link 64 may be fixed to shaft 56 on the outside of duct 55 and it forms with bosses 62, a bell crank lever. The end of link 64 opposite that connected to shaft 56 may be connected to one element 66 of a turnbuckle arrangement 67. The opposite element 68 of the turnbuckle 67 may be fixed to a spring or weight device 69 that is supported by a bracket 70 fixed to the outside of duct 55. By turning a nut 71, varying degrees of force can be applied to the link 64, and the nut 71 may be so adjusted that it maintains the damper 61 in a position against the action of the fluid flow, tending to close the damper so as to cause a predetermined fluid flow past the damper.

Referring to FIG. 6, it is evident that as the damper 61 moves from a closed position toward an open position, the force moment acting on damper 61 tending to open it decreases more rapidly than the force moment tending to close it. Furthermore, when damper 61 moves from an open position toward a closed position, the force moment tending to resist the closing increases more rapidly than that tending to effect such closing. Accordingly, as the pressure increases upstream, the damper moves clockwise toward the closed position; however, the force moment tending to resist such closing increases more rapidly than the force moment tending to effect such closing. This action, therefore, tends to equalize the force moments as the damper moves toward a closed position, thereby preventing slamming of the damper 61 closed.

In addition, snubbers 72, which are shown in FIG. 6 as being in the form of a labyrinth construction, may be provided in the ducts for cooperation with mating constructions on the dampers for each of the species disclosed to further prevent slamming of the dampers closed.

From the foregoing it is evident that a unique arrangement of a pivotal damper has been provided embodying differential force producing means that vary in response to variations in upstream fluid pressure which automatically produce an effective control of fluid flow past the damper and which variation in effective force producing means operates to prevent slamming shut of the damper.

Although the various features of the new and improved fluid flow control have been shown and described in detail to fully disclose several embodiments of the invention, it will be evident that numerous changes may be made in such details, and certain features may be used without others without departing from the principles of the invention.

What is claimed is:

1. In a flow control device, a duct; a damper mounted within said duct, and adapted to oscillate between closed and open positions; means for pivotally mounting said damper within said duct in a manner to provide effective area portions on each side of said pivotal mounting; a plurality of fluid passage means within one of said area portions to provide a differential effective area responsive to fluid flowing past said damper; and means for successively sealing off said passage means as said damper moves toward its closed position.

2. In a flow control device, a duct; a damper mounted within said duct, and adapted to oscillate between closed and open positions; means for pivotally mounting said damper within said duct in a manner to provide effective area portions on each side of said pivotal mounting; a plurality of fluid passage means within one of said area portions to provide a differential effective area responsive to fluid flowing past said damper; means for successively sealing off said passage means as said damper moves toward its closed position; and mean for normally urging said damper to a position where a predetermined flow of fluid past said damper occurs.

3. In a flow control device, a duct; a damper mounted within said duct, and adapted to oscillate between closed and open positions; means for pivotaly mounting said damper within said duct in a manner to provide effective area portions on each side of said pivotal mounting; a plurality of fluid passage means within one of said area portions to provide a differential effective area responsive to fluid flowing past said damper; separate vane means independently oscillatable about the axis of said pivotal mounting in line with each of said fluid passage means, said vane means being acted upon by the fluid flowing through said duct and positioned at different angular positions relative to each other; and means for normally urging said damper to a position where a predetermined flow of fluid past said damper occurs.

References Cited by the Examiner

UNITED STATES PATENTS 2,101,315  12/1937  Kemp _____ 137—493.1
2,358,260  9/1944  Simpson _____ 137—520

M. CARY NELSON, *Primary Examiner.*

MARTIN P. SCHWADRON, *Examiner.*